(12) United States Patent
Kennedy

(10) Patent No.: US 8,869,445 B2
(45) Date of Patent: Oct. 28, 2014

(54) FISHING LURE IMITATING WINGED PREY

(76) Inventor: Samuel Edward Kennedy, Watsonville, CA (US)

(*) Notice: Subject to any disclaimer, the term of this patent is extended or adjusted under 35 U.S.C. 154(b) by 361 days.

(21) Appl. No.: 13/333,590

(22) Filed: Dec. 21, 2011

(65) Prior Publication Data

US 2012/0180372 A1     Jul. 19, 2012

Related U.S. Application Data

(60) Provisional application No. 61/515,142, filed on Aug. 4, 2011, provisional application No. 61/458,541, filed on Jan. 13, 2011.

(51) Int. Cl.
*A01K 85/00* (2006.01)
*A01K 85/16* (2006.01)

(52) U.S. Cl.
CPC ............... *A01K 85/00* (2013.01); *A01K 85/16* (2013.01)
USPC ........ 43/42.27; 43/42.26; 43/42.24; 43/42.28

(58) Field of Classification Search
USPC ........... 43/42.27, 42.26, 42.24, 42.28, 4.5, 42
See application file for complete search history.

(56) References Cited

U.S. PATENT DOCUMENTS

| | | | | |
|---|---|---|---|---|
| 1,994,692 A * | 3/1935 | Davenport | .................. | 43/42.27 |
| 2,224,389 A * | 12/1940 | Haselwood | ................. | 43/42.27 |
| 2,517,962 A * | 8/1950 | Bastie | .......... | 43/42.12 |
| 2,587,189 A * | 2/1952 | McFarland | .................. | 43/42.27 |
| 2,612,717 A * | 10/1952 | Kuehnel | ....................... | 43/42.14 |
| 2,632,318 A * | 3/1953 | Meyer | .......................... | 464/66.1 |
| 2,938,294 A * | 5/1960 | Bachmann | .................... | 43/42.33 |
| 4,186,510 A * | 2/1980 | Kimerer, Jr. | ................. | 43/42.25 |
| 4,232,469 A * | 11/1980 | Shiverdecker | ............... | 43/42.27 |
| 5,133,148 A * | 7/1992 | Lawson | ....................... | 43/42.27 |
| 5,694,714 A * | 12/1997 | Basso et al. | .................... | 43/26.2 |
| D420,090 S * | 2/2000 | Troyer | ......................... | D22/132 |
| D472,956 S * | 4/2003 | Troyer | ......................... | D22/132 |

* cited by examiner

*Primary Examiner* — Christopher P Ellis
(74) *Attorney, Agent, or Firm* — Donald R. Boys; Central Coast Patent Agency, Inc.

(57) ABSTRACT

A fishing lure imitating a winged prey has a cylindrical body having a conical front end and a rounded rear end, one or more first groupings of flexible strands, the multi-strand groupings disposed transversely through walls of the cylindrical body and secured thereto, the free ends of each multi-strand group protruding substantially orthogonally from the cylindrical body on opposite sides to imitate bird wings, one or more second groupings of flexible strands disposed through a rear wall of the cylindrical body and secured thereto, the free end of each multi-strand grouping protruding from the rear of the cylindrical body to imitate a bird tail, and a hook assembly disposed longitudinally through the cylindrical body, the hook assembly including a shank having a closed front eyelet and a partially open rear eyelet, and a hook attached to the shank at the rear eyelet.

8 Claims, 11 Drawing Sheets

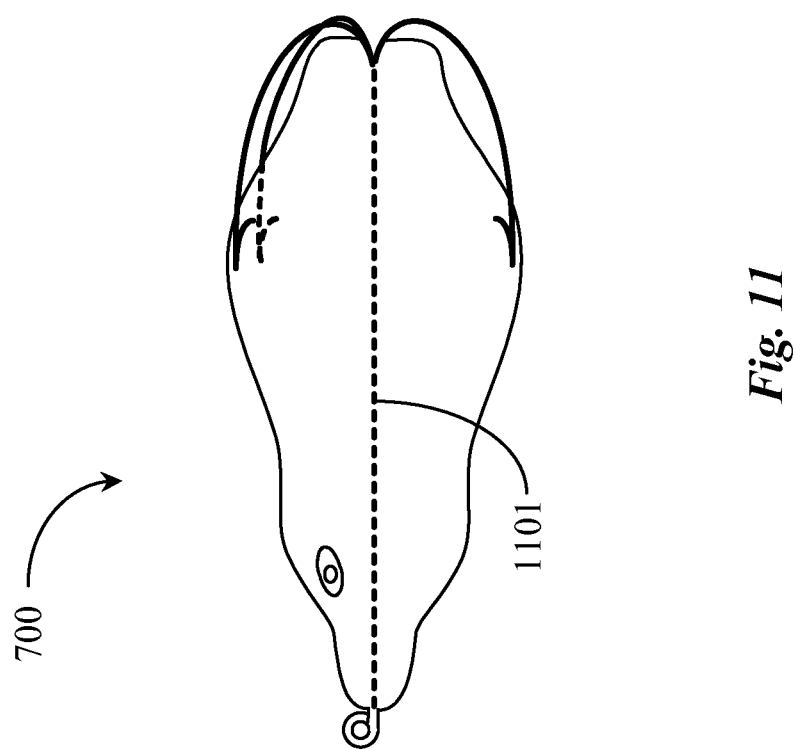

FISHING LURE IMITATING WINGED PREY

CROSS-REFERENCE TO RELATED DOCUMENTS

The present application claims priority to provisional patent application No. 61/458,541, filed on Jan. 13, 2011 and provisional patent application No. 61/515,142 filed Aug. 4, 2011, disclosures of which are incorporated herein at least by reference.

BACKGROUND OF THE INVENTION

1. Field of the Invention

The present invention is in the field of fishing lures and accessories and pertains particularly to lures made to imitate winged prey.

2. Discussion of the State of the Art

In the art of fishing, more particularly cast fishing, many different types of top water lures have been developed for cast fishing near structure along the shoreline of any particular body of water. Top water lures include hard, solid body type and soft, hollow body type lures adapted to imitate some form of natural prey the fish typically or atypically feeds upon.

One problem with traditional top water lures is that they are difficult to fish in heavy brush, stumps, lily pads, or tulle areas typically prized by anglers due to the ambush nature of many fish species. Many lures with single, double, or treble hook attachments become snagged on such cover or drag pieces of grass, twigs, etc. when retrieved.

Current soft body floating lures such as frogs, rats, and mice for example, get snagged because the body is too soft enabling casual contact with an object to expose the hook points. Most of these soft body lures also sink after a short time in the water.

Another limitation to cast fishing in heavy cover is keeping the offering in a desired zone for an extended period required to entice a strike. Most top water lures are pulled, swum, or popped through cover, over lily pads, etc. requiring repeated casts to a same zone before a fish will finally strike. Many times such repeated commotion puts the fish down after the first few casts.

Therefore, what is clearly needed is a fishing lure and method for fishing that solves the problems mentioned above.

SUMMARY OF THE INVENTION

The problem stated above is that longer lure exposure in a fishing zone is desirable for a cast fishing angler, but many of the conventional lures for cast fishing, such as poppers, buzz baits, swim baits, and frogs must be retrieved in order to entice a strike. The inventors therefore considered functional components of a cast fishing system, looking for elements that exhibit proper tensile strength and resiliency that could potentially be harnessed to provide top water cast fishing in heavy cover but in a manner that would not restrict the time that the lure is in the strike zone.

The present inventor realized in an inventive moment that if, after casting a top water lure into heavy cover, the lure could be caused to entice a strike without requiring retrieval of the lure away from the strike zone, significant increase in hookups to fish might result. The inventor therefore constructed a unique fishing lure for cast fishing that allowed for much longer time periods for the lure to float in the strike zone, while further inhibiting the potential for snagging the lure on brush or other heavy cover or structure. A significant increase in potential hookups results, with no impediment to casting or retrieving the lure created.

Accordingly, in one embodiment of the present invention, a fishing lure for imitating a bird is provided and includes a cylindrical body having a conical front end and a rounded rear end, one or more first groupings of flexible strands, the multi-strand groupings disposed transversely through the walls of the cylindrical body and secured thereto, the free ends of each multi-strand group protruding orthogonally from the cylindrical body on opposite sides to imitate bird wings, one or more second groupings of flexible strands disposed through the rear wall of the cylindrical body and secured thereto, the free end of each multi-strand grouping protruding from the rear of the cylindrical body to imitate a bird tail and, a hook or a hook assembly disposed longitudinally through the cylindrical body, the hook assembly including a shank having a closed front eyelet and a partially open rear eyelet, and a hook attached to the shank at the rear eyelet.

In one embodiment, the cylindrical body is hollow and molded from a polyvinyl chloride (PVC) based or rubber-based compound to form a soft but resilient lure body. In a preferred embodiment, cylindrical body is substantially buoyant, the buoyancy substantially equal at both ends of the cylindrical body. In one embodiment, the conical front end is reinforced to secure the front end of the hook assembly. In one embodiment, the lengths of the strands in the first groupings of flexible strands are controlled to produce the illusion of bird wings arcing forward. In one embodiment, the flexible strands are annular, hollow, silicon rubber strands or rectangular, hollow, silicon rubber strands.

In one embodiment, the hook is a double hook having two hook bends and two hook points diverging from a single hook shank. In this embodiment, the hook bends of the double hook protrude from the underside of the cylindrical body near the rear thereof, the bends substantially conforming about the rear end of the cylindrical body toward the upper surface, the hook points thereof pointing toward the front of the cylindrical body and resting in recesses provided in the upper surface of the cylindrical body.

In one embodiment, the fishing lure further includes a representation of bird legs and feet visible from beneath the lure. In a variation of this embodiment, the representation is that of physical objects resembling bird legs and feet secured to the underside of the cylindrical body. In the hollow bodied embodiment, the multi-strand groupings disposed transversely through the walls of the cylindrical body are secured there to by knots tied in the groupings, the knots disposed within the cylindrical body and abutting against the interior surface of the cylindrical body.

According to one aspect of the present invention, a method is provided for fishing a lure for imitating a bird, the lure including a buoyant cylindrical body, one or more first groupings of flexible strands protruding from the sides of the cylindrical body to imitate bird wings, one or more second groupings of flexible strands protruding from the rear of the cylindrical body to imitate a bird tail, and a hook or a hook assembly having at least one eyelet for accepting a fishing line. The method includes the steps (a) tying the lure to the end of a fishing line, the balance thereof reeled onto a fishing reel attached to a fishing rod, (b) using the fishing rod, casting the lure into a body of water, and (c) causing vibratory motion to the fishing lure.

In one aspect of the method, the cylindrical body is hollow having conical front end and a rounded rear end, and is molded from a pliable rubber to form a soft but resilient body. In a variation of this aspect, the cylindrical body is substantially buoyant, the buoyancy substantially equal at both ends of the cylindrical body. In one aspect, the hook or hook assembly is disposed longitudinally through the cylindrical body, the hook assembly including a shank having a closed front eyelet and a partially open rear eyelet, and a hook attached to the shank at the rear eyelet. In this aspect, the hook is a double hook having two hook bends and two hook points diverging from a single hook shank.

In one aspect, the lure further includes a representation of bird legs and feet visible from beneath the lure. In a variation of this aspect, in step (b), the imitated bird wings flex toward the cylindrical body in response to wind resistance during the cast. Also in this aspect, in step (b), the imitated bird wings resume an outstretched position after the lure is resting on the body of water. In one aspect of the method, in step (c), the vibratory motion is induced by manipulation of the fishing rod and or fishing line tied to the lure.

BRIEF DESCRIPTION OF THE DRAWING FIGURES

FIG. 11 is a plan view of the lure body of the fishing lure of FIG. 7 showing a straight shank treble hook implementation.

DETAILED DESCRIPTION

The inventor provides a fishing lure adapted in a preferred embodiment to imitate a bird, and that allows for snag-less operation in heavy cover fishing and more presentation time in a desired strike zone. The present invention is described in enabling detail using following examples, which may describe more than one relevant embodiment falling within the scope of the present invention.

Figure 1:
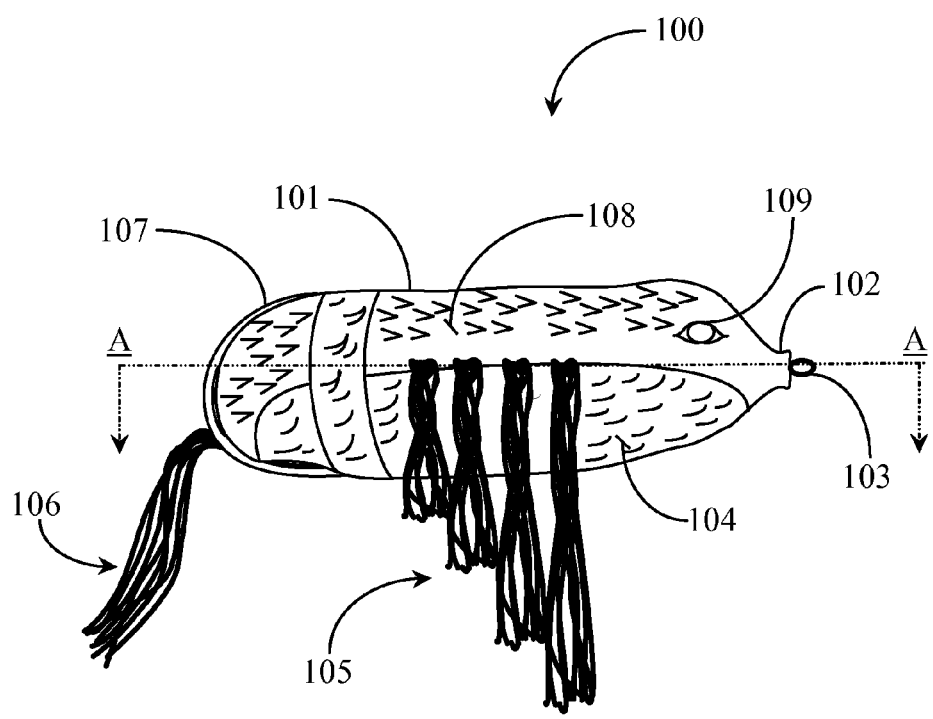
FIG. 1 is an elevation view of a fishing lure according to an embodiment of the present invention.

FIG. 1 is an elevation view of a fishing lure 100 according to an embodiment of the present invention. Fishing lure 100 is adapted in this example to imitate a live bird that has fallen in water. However the example of a bird imitation should not be construed as a limitation of the invention. Other characterizations for lure 100 are possible and may be considered according to one or more embodiments of the present invention. The inventor chooses to represent a bird in a preferred embodiment because of its position as a natural prey for certain predator species of game fish. In one embodiment of the invention, a dragonfly, bat, mosquito or any other flying prey which a fish eats may be imitated without departing from the spirit and scope of the present invention.

Fishing lure 100 includes a cylindrical body 101 having a conical front end and a rounded rear end. Body 101 may be injection molded from a flexible but resilient rubber or polymer-based compound or composite like Neoprene, Polyvinyl Chloride (PVC) based material, or a similar composite. Body 101 in one embodiment is molded in the form of a bird body wherein the conical end represents the bird's beak and the rounded end, the bird's rear parts. In one embodiment, the molding process used is a Rotoblast™ process used in rotational molding known to and available to the inventor.

In a preferred embodiment, body 101 is a hollow body whereby certain portions are reinforced by allowing greater material thickness to form in the specified areas. In one embodiment, thickening the mold materials immediately around the conical shape that represents the bird's beak reinforces the conical end of cylindrical body 101. Body 101 may also be reinforced in other areas supporting various features of the lure. In one embodiment, cylindrical body 101 is a solid body (not hollow). In this embodiment, the body might be formed of a porous buoyant material such as foam that cures and can be used in a molding process as an injection molding material.

In one embodiment, Body 101 is textured on the outer surface 108 of body 101. Texturing 108 may be achieved in part by indentations and or protrusions made in the surface of the mold cavity used to form body 101. In one embodiment, the material used to mold body 101 is impregnated with fibrous polymer or other heat resistant fibrous materials to improve resiliency and to simulate texture such as bird feathers or down. In this example, fishing lure 100 includes a pair of bird's eyes 109. Bird's eyes 109 may include eyelids and a false eyeball. These features may be molded into the body or applied after the body is molded without departing from the spirit and scope of the present invention. In one embodiment, lure body 101 includes colored sections and or patterns that mimic a bird's variation in natural color pattern. One such section is illustrated herein by under section 104 representing the bird's typically lighter underside. Stripes, bars, and other colored sections may also be incorporated to mimic natural color variations in a bird without departing from the spirit and scope of the present invention.

In a preferred embodiment, lure 100 floats indefinitely and buoyancy is controlled along cylindrical body 101 in the molding process to provide substantially equal buoyancy at both the conical and rear ends of body 101 so that the lure does not list while afloat and so that it moves laterally across the water when pulled without diving beneath or rising up out of the water. Equilateral buoyancy across the length of body 101 is accomplished through an empirical method of calculating weights of various features of the lure and hook assembly and refining the mold cavity to enable appropriate distribution of materials accordingly, so that air pockets residing within the lure body in the hollow embodiment are sized to result in the equilateral buoyancy.

Fishing lure 100 includes, in this example, a pair of bird wings 105 (one each side) and a bird tail 106. Bird wings 105 are characterized by one or more grouping of flexible, yet resilient strands of rubber or similar buoyant material. In this example, there are four groupings of strands on each side of lure body 101. Each grouping of strands is held to a unique protrusion length from the lure body so that simulation of an outstretched wing is achieved when the lure is floating on water.

In one example, the strands are annular and hollow to aid buoyancy. In another example, the strands are rectangular and hollow to aid buoyancy. In a preferred embodiment, each strand is geometrically similar to other strands in the grouping; however geometric mixes may be used without departing from the spirit and scope of the present invention. Tail 106 in one embodiment is a single grouping of flexible but resilient strands that may be of the same likeness including geometry as those making up wings 105. In this view, the hook assembly is not entirely visible and is described in more detail later in this specification relative to FIG. 3 in section view. However, the assembly includes at least one hook 107 and eyelet 103 adapted to accept fishing line. Further the tail 106 could be comprised of yarn, string, feathers, or any other synthetic material that floats and is formulated to be flexible and rigid enough to return to the original shape.

In this elevation view, wings 105 and tail 106 are flexible enough to hang down when lure 100 is not floating on water, but resilient enough to assume a lateral position when the lure is floating on water. The weights of wings 105 are held consistent on either side of lure body 101 to prevent listing and to prevent any unwanted drift during casting or pitching into heavy cover, which requires considerable accuracy. The flexibility of the wing strands is controlled such that the strands will form close to the lure body during casting, eliminating drag from the wings. The wings could be comprised of yarn, string, feathers, or any other synthetic material that floats and is formulated to be flexible and rigid enough to return to the original shape.

Figure 2:
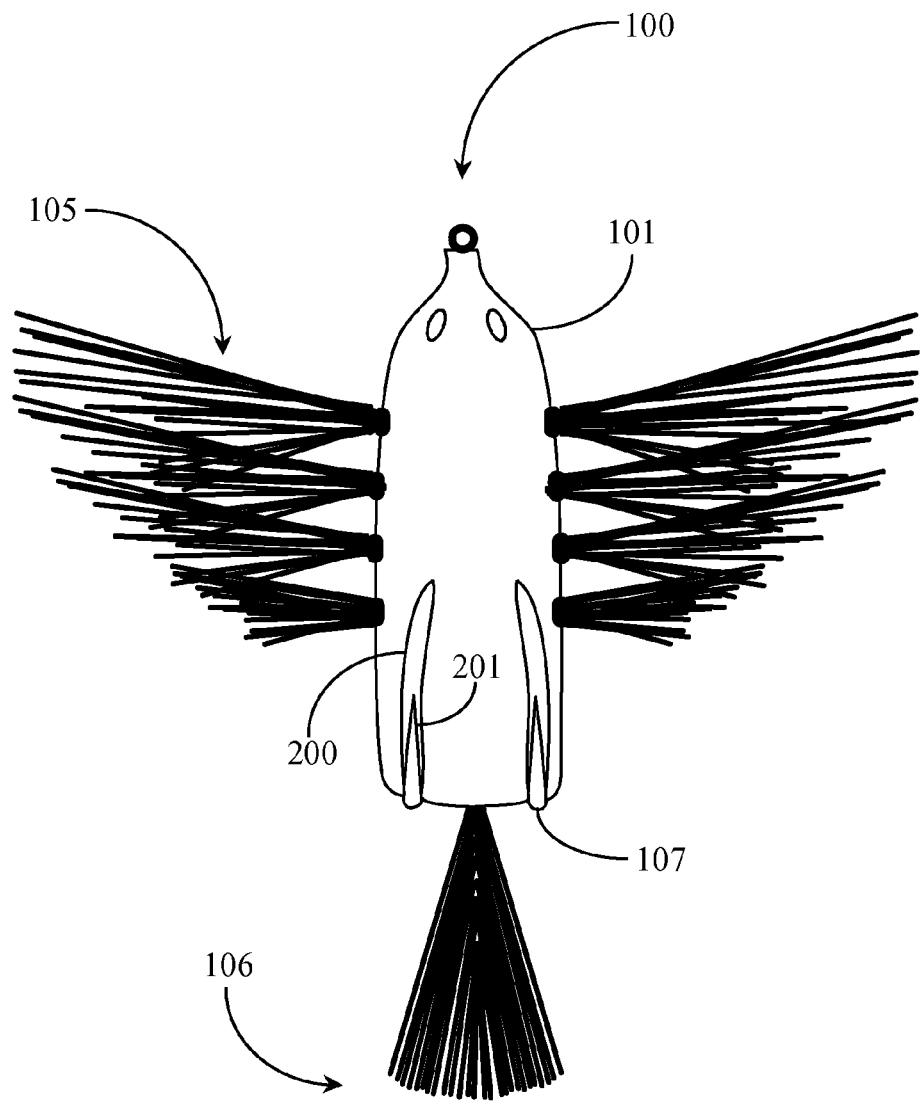
FIG. 2 is a top view of the fishing lure of FIG. 1.

FIG. 2 is a top view of fishing lure 100 of FIG. 1. Fishing lure 100 is viewed from overhead in this example and outstretched wings 105 and tail 106 are illustrated in at rest position as if the lure body were floating on a body of water. Tail 106 fans out and is buoyant simulating a V-shape bird's tail. Wings 105 fan out and are buoyant simulating outstretched bird wings. The overall lengths of each grouping of strands are ordered in such a manner that grouping of strands provide the silhouette of outstretched wings in a realistic manner.

Cylindrical body 101 includes hook recesses 200 formed into the body during the molding process. Recesses 200 are symmetrically disposed on top of and toward the rear of lure body 101 and are adapted to conceal hook points 201 of hook 107. In this example, hook 107 is a double hook featuring two hook points 201 requiring two recesses 200. Hook points 201 may be barbed or barbless. In an embodiment where hook points 201 are barbed the barbs may reside on the outside of the hook bend or on the inside of the hook bend.

In a preferred embodiment, the hook bends of the double hook protrude from the underside of the cylindrical body near the rear thereof, the bends substantially conforming about the rear end of the cylindrical body toward the upper surface, the hook points thereof pointing toward the front of the cylindrical body and resting in recesses provided in the upper surface of the cylindrical body.

In another example, hook 107 may be a single hook with one hook point and one recess disposed centrally on top of body 101. The resiliency of lure body 101 is such that it is stiff enough to prevent exposure of the hook points from recesses 200 unless suitable force from a striking fish is applied. In this way, hook point exposure is greatly reduced during lure movement and retrieval from typical soft-body imitations that float or sink. In one embodiment, wire or stiff fiber snag guards may be incorporated into the hook design, however such apparatus may reduce the potential number of hook-ups with fish while using lure 100.

Figure 3:
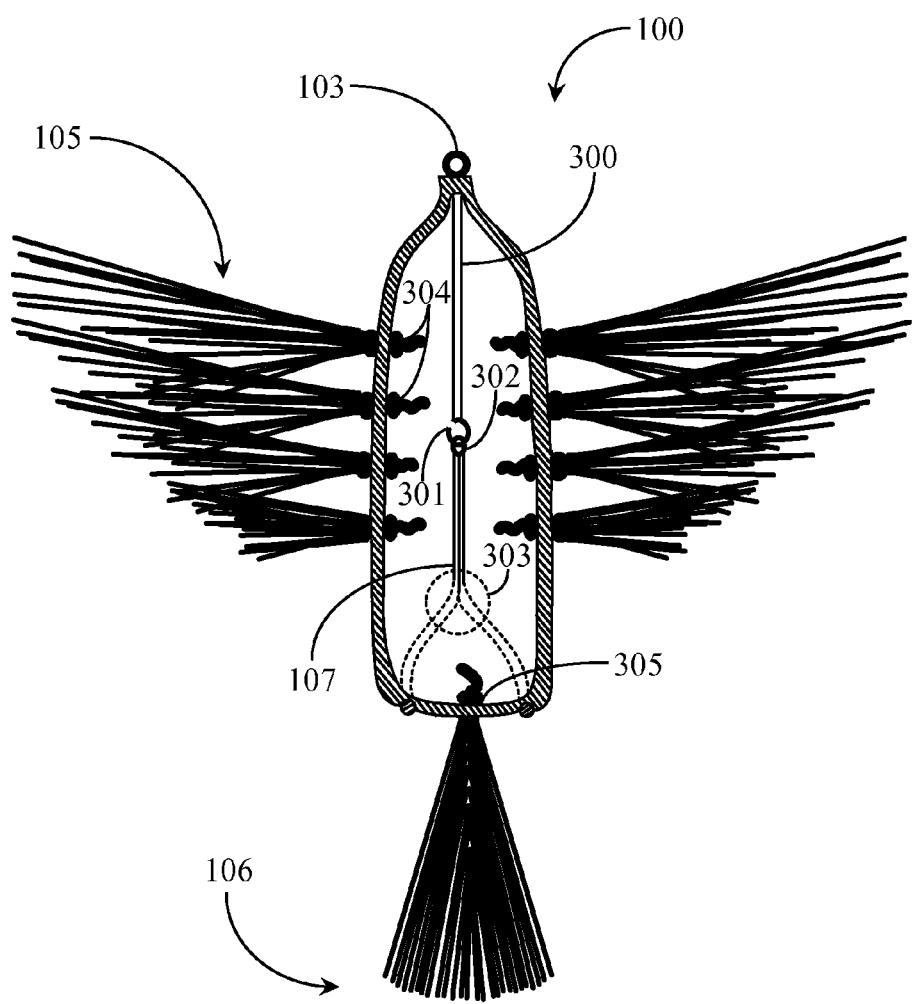
FIG. 3 is a section view of the fishing lure of FIG. 1 viewed along the section line AA in FIG. 1 according to an embodiment of the present invention.

FIG. 3 is a section view of fishing lure 100 of FIG. 1 viewed along the section line AA in FIG. 1 according to an embodiment of the present invention. Lure 100 includes a hook assembly as mentioned further above and that is visible in this sectioned overhead view. The hook assembly includes a shank 300 with a gapped eyelet 301 disposed at the rear of the shank. Eyelet 103 is disposed at the end opposite eyelet 301. Shank 300 connects to hook 107 at a hook eyelet 302.

In this example, hook 107 exits or protrudes from lure body 101 at a general egress area 303 on the bottom surface of the lure body forward from tail feature 106. The hook bends and points are cut off in this sectioned view and are not visible in this view. The portions of hook 107 that are on the outside of lure body 101 are illustrated with a broken boundary. In this example, hook 107 and shank 300 form a jointed hook assembly that may be inserted or assembled into lure body 101 after the molding process. Egress area 303 may or may not be reinforced with thicker material during the molding process. Reinforcement for specific areas of lure body 101 may be provided in ways other than thickening the material at the targeted area. Other ways to reinforce portions of the cylindrical body include adding reinforcing materials to the lure after the molding process using glue or other attachment methods.

Wings 105 are disposed transversely through openings in the walls of lure body 105 and are secured in place by knots 304 tied in the individual groupings of flexible strands. In this example the strands are grouped into eight groupings. Knots 304 serve as stops preventing unintended pullout of the wing components from the lure body, thereby reinforcing the wing feature of lure 100. The openings within the lure body are kept much smaller than the diameter of the knots, but can stretch according to material properties to accommodate the knots when the lure is assembled.

In one embodiment, wings 105 may further be secured by knots tied into the strand groupings that are strategically disposed to abut against the outer surface of the bird lure as an extra positioning measure to prevent wings 105 from encroaching into the interior of body 101 in the hollow embodiment. In one embodiment, wings 105 are contiguous with wing tips formed at both ends of a grouping of strands. In this embodiment, the strands are disposed contiguously through the lure body, each single strand forming two opposing wing tips.

Tail 106 is secured to body 101 via a knot 305 disposed strategically near one end of the tail strands. An opening is provided through body 101 where tail 106 is installed, the opening held much smaller than the knot but able to accommodate insertion of the knot through the wall of the body via the stretch property of the lure body. Once the knot is inserted, the opening encloses around the knot preventing pull out of the tail feature. In a preferred embodiment, wings 105 do not connect through the cylindrical body, and are installed in similar fashion as tail 106. In this embodiment, there may also be knots disposed externally to the lure body to prevent the wing from encroaching into the interior of the lure body.

Section line AA of FIG. 1 may generally represent a water line when lure 100 is floating. It is important to note herein that in a preferred embodiment, there are no protrusions or openings on the lure body that sit at or above the waterline when the lure is floating. In this way, the lure retains trapped air and floats indefinitely.

Figure 4:
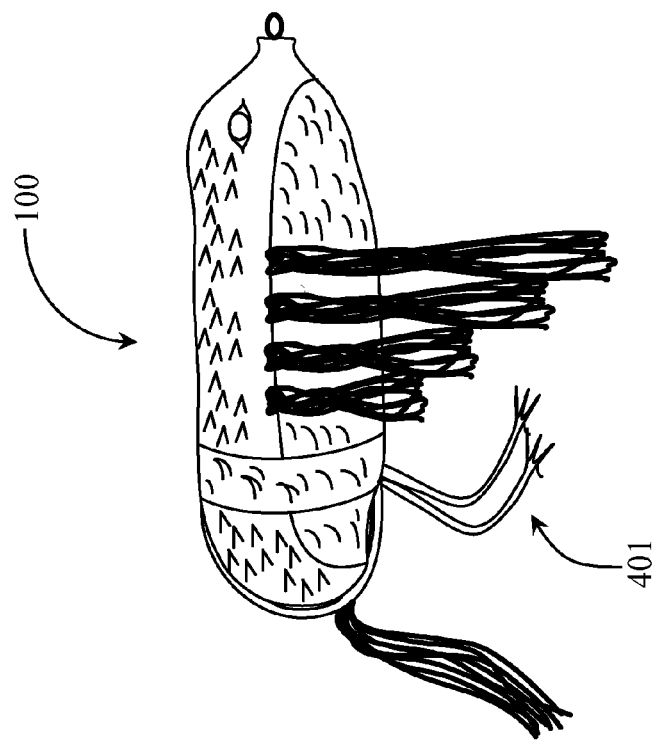
FIG. 4 is an elevation view of the fishing lure according to a further embodiment of the present invention.

FIG. 4 is an elevation view of fishing lure 100 according to a further embodiment of the present invention. In this example, fishing lure 100 further includes a feature 401 that simulates bird legs. Bird legs 401 may be fashioned with stiff fibers grouped and tied for insertion through the underside of cylindrical body 101. In other embodiments, other simulation methods may be employed to simulate bird legs and feet. In one embodiment, bird legs are simply painted, drawn, or otherwise depicted on the outer surface of body 101 at an area on the underside of lure 100 where it would be expected to see bird legs.

Figure 5:
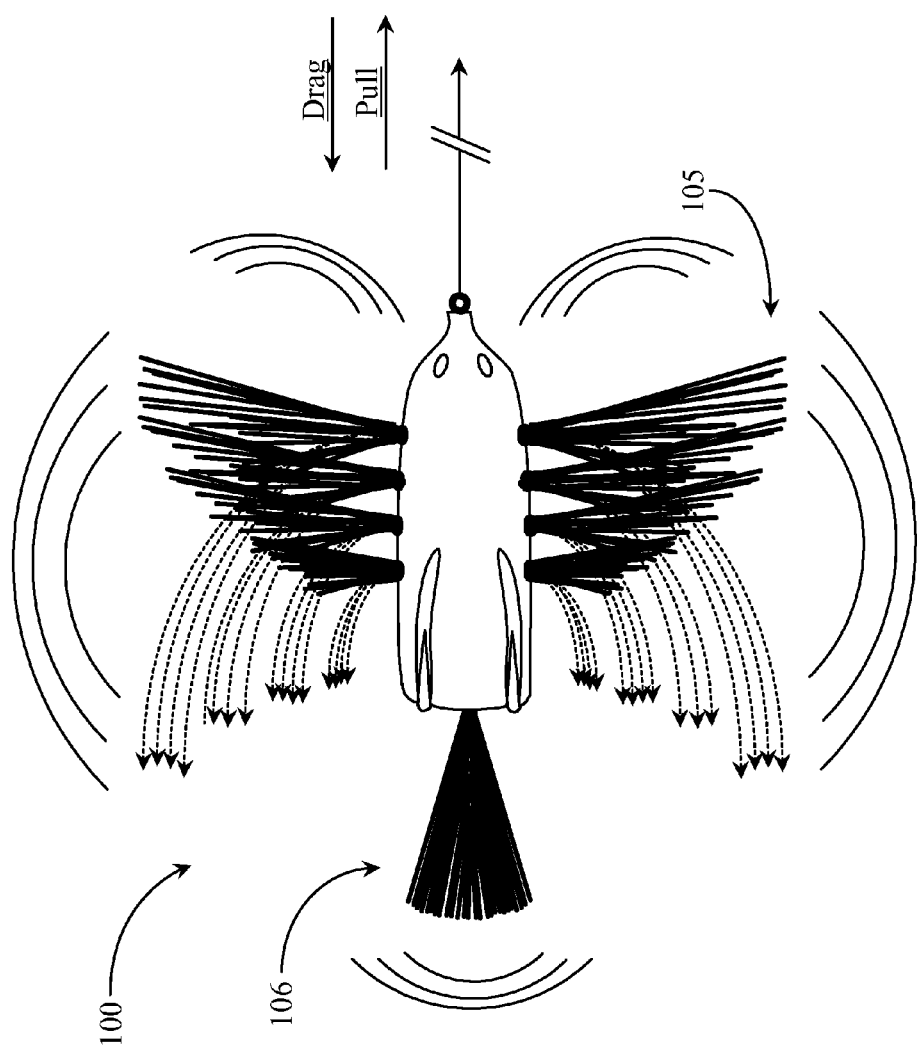
FIG. 5 is an overhead view of the fishing lure of FIG. 1 depicting motion on the surface of water.

FIG. 5 is an overhead view of fishing lure 100 of FIG. 1 depicting motion on the surface of water. Fishing lure 100 may float in one position on a body of water for an indefinite period once cast or pitched into a target strike zone. The silhouette of wings 105 provides an underwater view of outstretched wings. Similarly, tail 106 provides an underwater view of an outstretched bird tail fanned out in the water.

A slight twitch of fishing lure 100 while at rest on water produces a flux in wings 105 simulating that the bird is alive, but incapacitated and unable to fly or escape. Another feature of operation of lure 100 is that when a fisherman pulls or "twitches" fishing lure 100 forward by a pull in the direction of the arrow labeled pull, wings 105 flex rearward with the force of the pull as illustrated by the broken directional arrows immediately behind wings 105. The wings resume their original position in the water when the pull force is terminated followed by slack in the fishing line, creating a drag force represented herein by a directional arrow labeled drag. This motion follows the principal that for every action there is an equal and opposite reaction. The drag created by the resiliency of the flexible strands of the wings helps to keep fishing lure 100 in the same general location of the original targeted strike zone that the lure was tossed into on the first cast. In this way, the lure may be fished extensively in heavy cover with a provision of more time in the strike zone.

Retrieval of fishing lure 100 may be necessary only to redeploy the lure to another possible strike zone identified in heavy cover. Another feature enabled by the flexibility of wings 105 is further protection against snags during lure retrieval. Lure retrieval induces a rearward flex in wings 105 in the direction of the broken arrows. While wings 105 are in a rearward flexed position, they provide further "weed" guard against snagging the lure against floating debris or grounded cover. This same flexibility also offers a straight and unwavering pitch or cast of lure 100 into a strike zone.

Figure 6:
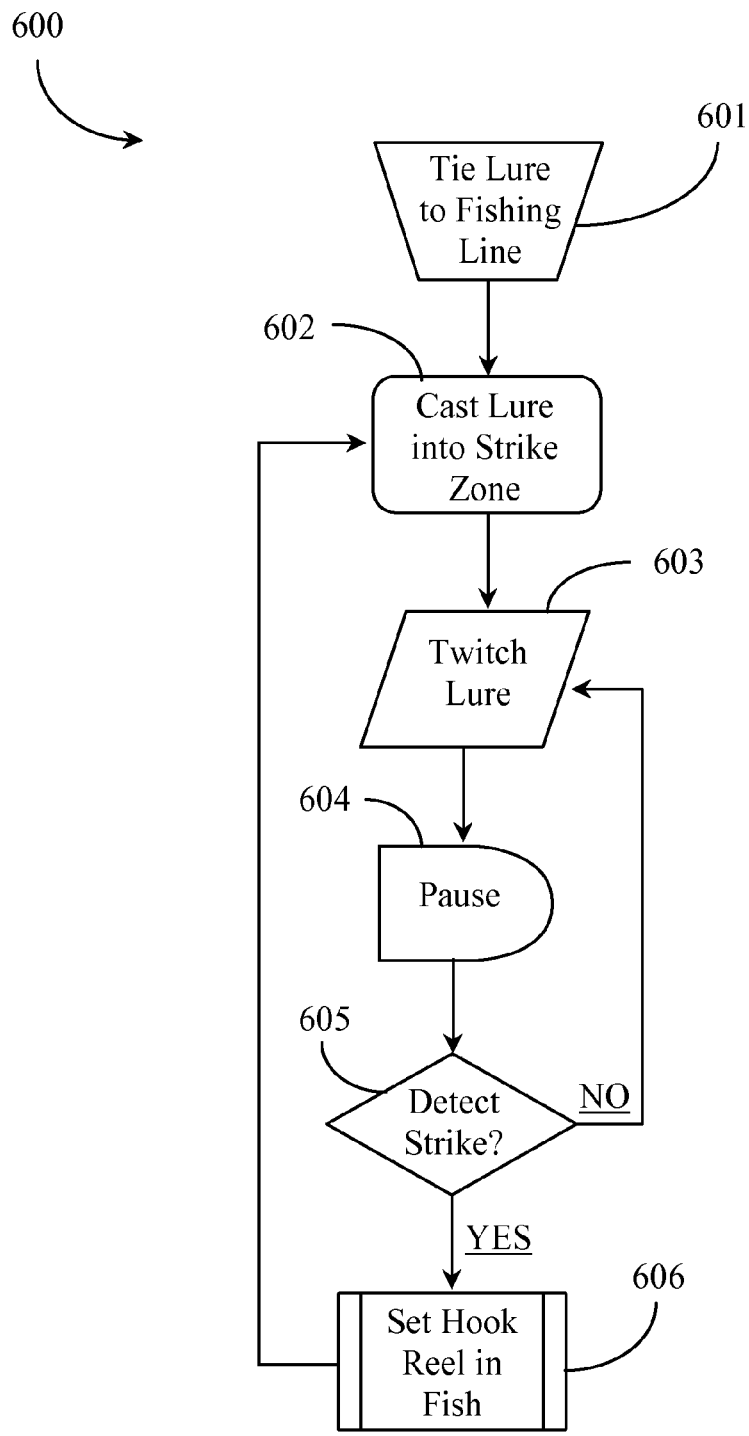
FIG. 6 is a process flow chart illustrating steps for fishing the lure of FIG. 1.

FIG. 6 is a process flow chart 600 illustrating steps for fishing lure 100 of FIG. 1. At step 601, a fisherman ties the fishing lure analogous to lure 100 of FIG. 1 to a fishing line. In one embodiment, the fishing line is connected to a fishing reel on a fishing rod. In an alternate embodiment, the fishing line may be connected to a still fishing cane pole. At step 602, the lure is cast or pitched into a target strike zone. A strike zone may be a hole in a blanket of lily pads or a spot of water under a shade tree where the fisherman expects a strike is possible.

At step 603, the fisherman attempts to elicit a strike by twitching the lure in place. This is done to simulate a bird that has fallen into the water. At step 604, the fisherman pauses to provide a window for a strike that might result from the twitching action. At step 605, the fisherman makes a determination of whether there has been a strike on the lure.

At step 605, if a strike is detected, the fisherman sets the hook at step 606 and reels in the fish. The process may then resolve back to step 602 where the fisherman casts or pitches the lure into another targeted strike zone, typically along heavy cover. If the fisherman does not detect a strike at step 605, the process resolves back to step 603 where the fisherman resumes twitching the lure. Step 603 and step 604 may be repeated in succession many times before the fisherman ultimately catches a fish decides to retrieve the lure for another cast.

Figure 7:
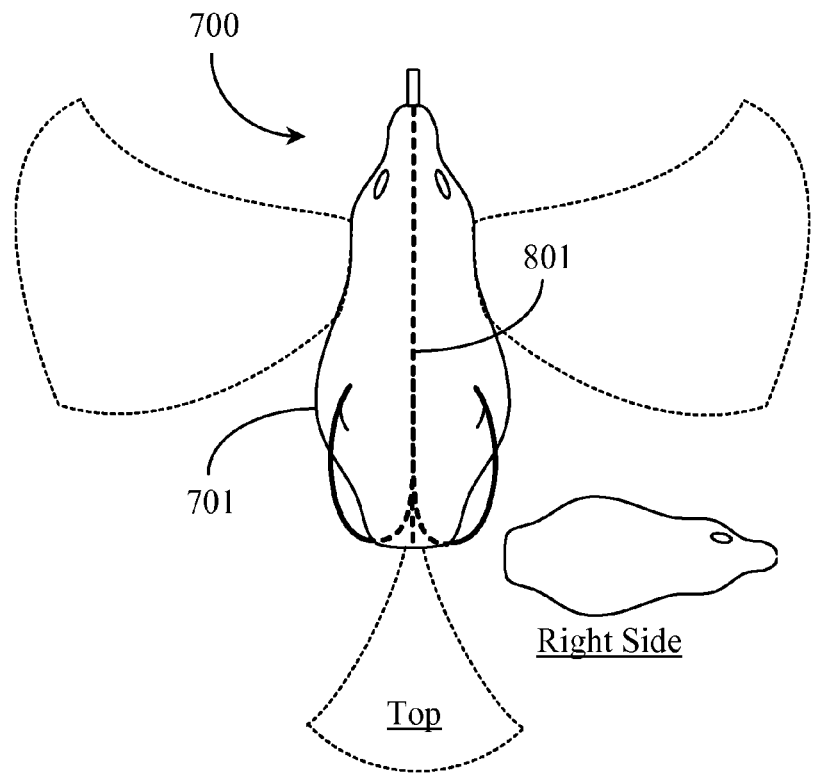
FIG. 7 is a top view of a fishing lure with a right-side profile of the lure body according to another embodiment of the present invention.
Figure 8:
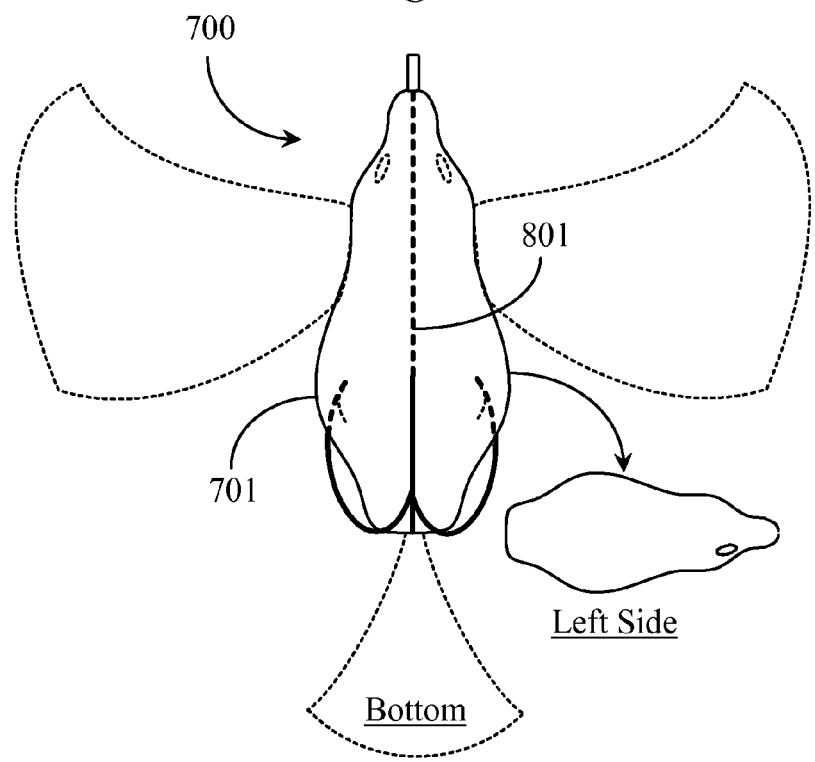
FIG. 8 is a bottom view of the fishing lure of FIG. 7 with a left-side profile of the lure body.

FIG. 7 is a top view of a fishing lure 700 with a right-side profile of the lure body according to another embodiment of the present invention. FIG. 8 is a bottom view of fishing lure 700 of FIG. 7 with a left-side profile of the lure body. Referring now to FIG. 7, fishing lure 700 is adapted to imitate a bird as described further above with respect to fishing lure 100. In this example, the wings and tail are represented by broken boundaries in the general displayed shapes of those appendages while the lure is floating on a body of water.

Lure 700 includes a buoyant lure body 701 that may be manufactured in the same fashion as described for lure 100. In this example however, lure body 701 is formed in a symmetrical manner with respect to the molding process in such a way as to provide the same body profile for the top, bottom and side views of the lure. In this top view, the eyes are visible. Also in this example, lure 700 includes a hook 801. Hook 801 is a single wire hook formed about the eye with equal lengths of remaining wire to form the rest of the hook. In this view (top) the hook points are visible. A representative right side view of lure 700 (reduced in size to save drawing space) is depicted to communicate that the profile of the side of the lure is identical in shape to the profile of the top of the lure.

Referring now to FIG. 8, the bottom view of lure 700 is depicted. As described further above, the wings and tail are represented by broken boundaries in the general shape of those appendages when the lure is floating on a body of water. Body 701 as seen from underneath the lure has an identical profile as the top of the lure. Hook 801 is visible at the split and bends of the hook. The eyes are not visible and are represented here by broken boundaries. In one embodiment, the eyes may be placed both on the top of lure 700 and on the bottom of lure 700 so that there are two pairs of eyes symmetrically opposed. A representative left side view of lure 700 (reduced in size to save drawing space) is depicted to communicate that the profile of the left side of the lure (upside down) is identical in shape to the profile of the bottom, top, and right side profile of the lure. Maintaining a consistent symmetry with respect to shape at 360 degree views about the lure body orientation provides the same view to a predator fish regardless of how the lure lands in a body of water when cast.

Figure 9:
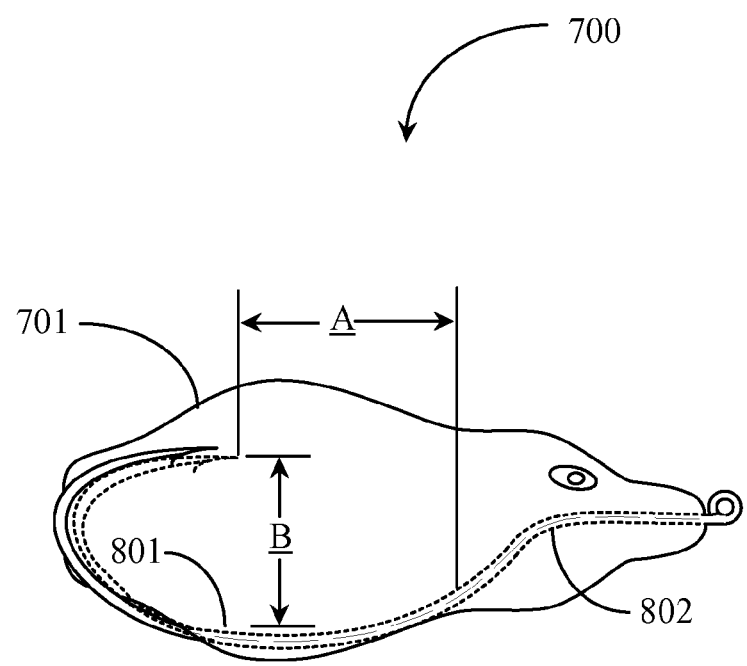
FIG. 9 is a plan view of the lure body of the fishing lure of FIG. 7 showing a hook adapted to increase the unobstructed strike length of the lure according to an embodiment of the present invention.

FIG. 9 is an elevation view of lure body 701 of the fishing lure of FIG. 7 depicting hook 801 adapted to increase the unobstructed strike length of the lure according to an embodiment of the present invention. Lure body 701 is seen in right side elevation in this example. The shape profile of body 701 is consistent regardless of view angle. Hook 801 is a double hook in this example. Hook 801 may be manufactured of suitable wire available in hook manufacturing. Hook 801 may be formed using hand operated tools such as a jig and press. Hook 801 is made of a single length of contiguous hook wire formed about a dowel to make the hook eye with relatively equal lengths of the wire reserved for forming the hook shank, bends, and points.

In this example, hook 801 (side profile) has a bend 802 located at or about the eye of fishing lure 701 when properly positioned therein. Bend 802 follows a relative straight portion from the hook eye and progresses downward toward the bottom inside surface of lure body 701, the bend beginning just past the bird eye in this example.

The purpose of bending the hook closer to the hook eye is to allow the contoured portion of the hook to lie along the natural contour of the bottom inside surface of the lure body and anterior portion of lure body 701. This unique adaptation enables a much longer unobstructed strike space for a predator fish to bite down on the soft body without being obstructed by any part of the hook including the hook shank. The estimated obstruction free bite or strike length is dimension A and is roughly measured from the hook points out to a point along the hook shank behind bend 802 where it may be considered that a bite at the stated point might be obstructed by the fish contacting the hook shank behind the bend before being hooked. The maximum hook gap B becomes gradually less along length A to the point where the probability of inconsistent hookup because of a smaller hook gap increases significantly. Additionally it is known to the inventor that if a large bass or other predator fish bites and feels the hard material of the hook shank the bass will typically spit the lure out. The bending of the lure shank to follow the contour of the bottom of the lure significantly increases the sweet spot bite area of the lure.

Figure 10A:
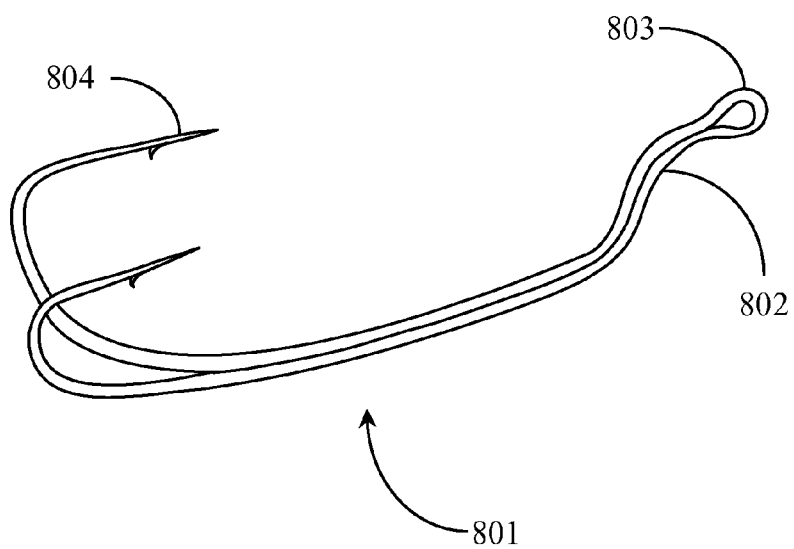
FIG. 10A is a perspective view of the hook of FIG. 9.

FIG. 10A is a perspective view of the hook of FIG. 9. Hook 801 is fashioned from a single contiguous piece of hook wire. Bend 802 significantly lengthens the strike distance represented above by distance A where the hook gap is still large enough to provide consistent hookup. Hook 801 may be formed about pin, dowel, or any other method of hook manufacture, forming hook eye 803. The wire is bent around the eye and directed downward adjacently toward the split in hook 801 that forms the adjacent hook bends 804. To keep the hook from separating, the wire may be brazed together along the shank.

Figure 10B:
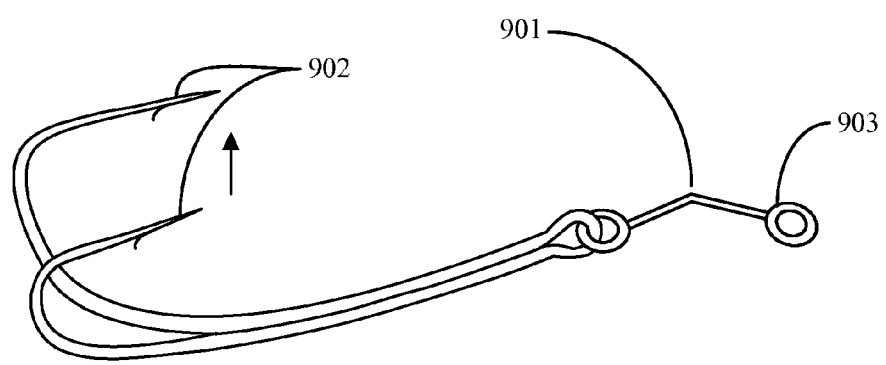
FIG. 10B is a perspective view of a cam configuration hook.

FIG. 10B is a perspective view of a cam action hook. In this embodiment when eyelet 903 is pulled, interconnecting member 901 causes movement through the connections in the hook which causes hook points 902 to move in an upward direction because of the bend in member 901. In this embodiment the movement of the hook points in an upward direction when pulled increases the likelihood of hooking a fish.

The contour of the hook past bend 802 is adapted to conform significantly to the contour of the lure body until the hook egresses the body of the lure where the hook tangs arc about the rear portion of the lure body, the hook points facing forward and protected, in some embodiments, by recesses formed in the soft lure body. In one embodiment where recesses are provided to protect the hook from hook point exposure, the recesses are the only feature, except perhaps the bird eyes and coloring or markings, if any, that distinguishes the top of the lure from the bottom of the lure. \

FIG. 11 is a plan view of lure body 700 of FIG. 7 showing a straight-shank treble hook implementation. In this view, lure body 700 hosts a treble hook 1101 having a straight shank.

Figure 12:
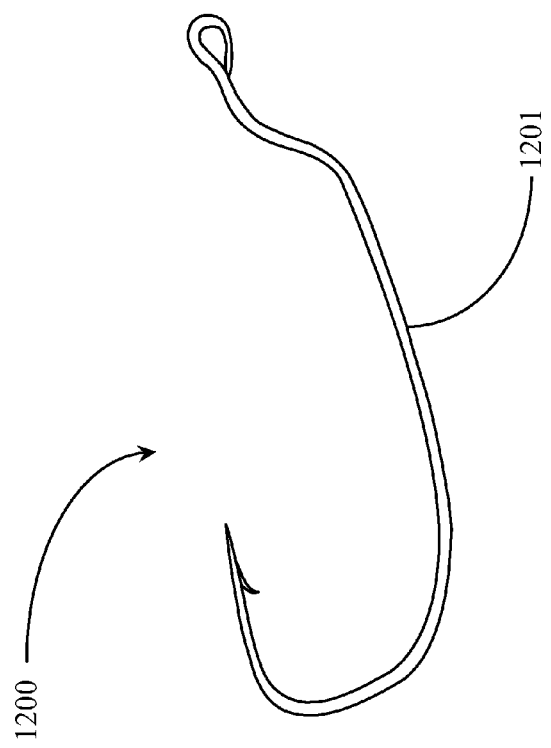
FIG. 12 is a perspective view of a single shank hook of the same design as the hook of FIG. 9.

FIG. 12 is a perspective view of a single shank hook 1201 in the same design as double-shank hook 801 of FIG. 9. Hook 1201 has the same shape of hook 801 but is a single hook implementation. When implemented in the lure body, the hook may face up with the barb out of water, or down with the barb under the water line.

It will be apparent to one with skill in the art that the fishing lure and method of the invention may be provided using some or all of the mentioned features and components without departing from the spirit and scope of the present invention. It will also be apparent to the skilled artisan that the embodiments described above are specific examples of a single broader invention that may have greater scope than any of the singular descriptions taught. There may be many alterations made in the descriptions without departing from the spirit and scope of the present invention.

What is claimed is:

1. A fishing lure imitating a bird comprising:
a substantially cylindrical, flexible hollow body having a central long axis, the body shape tapering from a common larger diameter to a substantially smaller diameter at a front end and having a rounded rear end, the cylindrical body implemented to exhibit substantially equal longitudinal buoyancy, causing the body when floating on a water surface to float with the long axis substantially parallel with the surface in an orientation defining a body top, a body bottom, a height from top to bottom, a length, a left side facing front, and a right side facing front, the buoyancy providing a water line;
a set of two simulated eyes, one eye positioned on the left side of the body toward the front end, another eye positioned on the right side of the body directly opposite the one eye;
two first groupings of buoyant flexible strands joined at one end each to the body at a common height below the water line on directly opposite sides of the body at a point along the length rearward of the set of simulated eyes, the flexible strands of the two first groupings having a first average length;
two second groupings of buoyant flexible strands joined at one end each to the body at a common height below the water line on directly opposite sides of the body at a point along the length rearward of the position of the two first groupings of flexible strands, the flexible strands of the two second groupings having a second average length less than the first average length;
a third grouping of buoyant flexible strands joined to the body at a central point of the rounded rear end below the water line, extending generally rearward in the direction of the long axis; and
a hook element disposed longitudinally through the cylindrical body, the hook having an eyelet extending outward through an opening from the front end of the body below the water line, a shank extending rearward in the body along the long axis to about the position of the simulated eyes, then bending downward, then rearward again to lie along the bottom of the body within the body to near the rear end, then curving upward in the shape of the rounded rear end, exiting the body through an opening below the waterline in an upward facing lengthwise recess, then bending forward to present a hook point facing in a forward direction, the point concealed in the recess and positioned at a point along the length rearward of the second groupings of buoyant flexible strands.

2. The fishing lure of claim 1, wherein the cylindrical body is hollow and molded from a polyvinyl chloride (PVC) based or rubber-based compound to form a soft but resilient lure body.

3. The fishing lure of claim 1, wherein the tapered front end is reinforced to secure the front end of the hook assembly.

4. The fishing lure of claim 1, wherein the buoyant flexible strands in the two first groupings and the two second groupings are joined in each grouping at the end joined to the body, and have a rigidity low enough that with the body suspended in air the strands droop downward, and high enough that with the body floating on the surface the strands fan out straight on the surface from the joining point, some strands facing somewhat forward and some strands facing somewhat rearward from the joining point on the body for each grouping.

5. The fishing lure of claim 1, wherein the buoyant flexible strands are annular, hollow, silicon rubber strands or rectangular, hollow, silicon rubber strands.

6. The fishing lure of claim 1, wherein the hook is a double hook having two hooks at the rear diverging from a single shank, each hook following the curvature of the rounded rear end within the body and exiting the body in parallel lengthwise recesses ending in points facing forward concealed in the parallel recesses.

7. The fishing lure of claim 1 further comprising simulated bird legs and feet extending from beneath the body.

8. The fishing lure of claim 2, wherein the groupings of buoyant flexible strands each pass through an opening in the body at points below the water line, and are secured within the body by knots or clamping elements larger than the openings through which the groupings of strands pass at each joining point to the body.

* * * * *